(12) United States Patent
Yasuda

(10) Patent No.: US 7,501,723 B2
(45) Date of Patent: Mar. 10, 2009

(54) DRIVING DEVICE

(75) Inventor: Hiromu Yasuda, Yokohama (JP)

(73) Assignee: Canon Kabushiki Kaisha (JP)

( * ) Notice: Subject to any disclaimer, the term of this patent is extended or adjusted under 35 U.S.C. 154(b) by 60 days.

(21) Appl. No.: 11/459,619

(22) Filed: Jul. 24, 2006

(65) Prior Publication Data

US 2007/0018512 A1    Jan. 25, 2007

(30) Foreign Application Priority Data

Jul. 25, 2005    (JP) ............... 2005-214898

(51) Int. Cl.
*H02K 41/00* (2006.01)
(52) U.S. Cl. .......................... 310/12; 310/15
(58) Field of Classification Search ............ 310/12–15, 310/49 R, 181, 80
See application file for complete search history.

(56) References Cited

U.S. PATENT DOCUMENTS 5,079,458 A * 1/1992 Schuster ............... 310/12
5,687,614 A * 11/1997 Hashimoto et al. ........... 335/285
6,670,738 B2 * 12/2003 Kasahara et al. ............ 310/309
7,242,118 B2 * 7/2007 Sakamoto ................. 310/15

FOREIGN PATENT DOCUMENTS

JP      6-78494 A     3/1994
JP      3434430 B2    5/2003

* cited by examiner

*Primary Examiner*—Dang D Le
(74) *Attorney, Agent, or Firm*—Rossi, Kimms & McDowell LLP

(57) ABSTRACT

A driving device easy to manufacture. A slider formed of a soft magnetic material has spiral threads running along an axial direction of the slider. A stator formed of a soft magnetic material supports the slider movably along the axial direction. First and second coils fixed to the stator magnetize those portions of the spiral threads which are in first and second areas of the slider. Each of first and second magnets fixed to the stator has a magnetized surface thereof opposed to a corresponding one of the first and second areas and magnetized in a shape corresponding to a shape of the spiral threads.

7 Claims, 11 Drawing Sheets

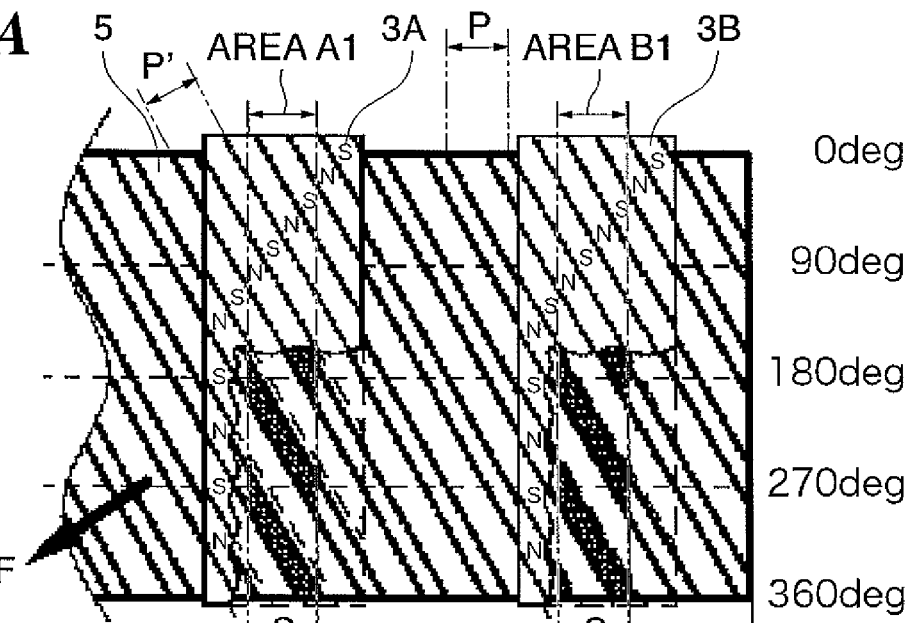
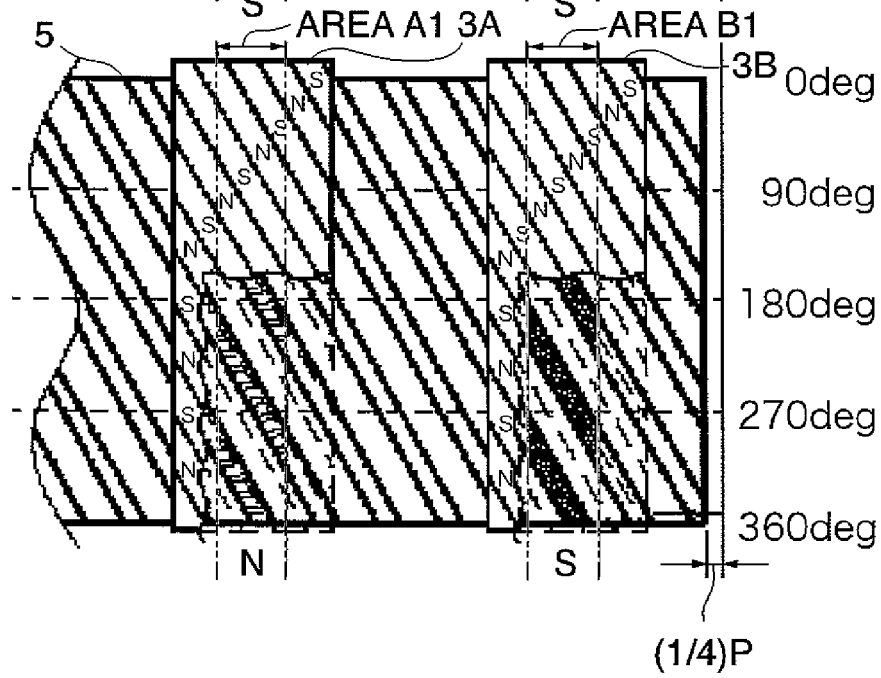

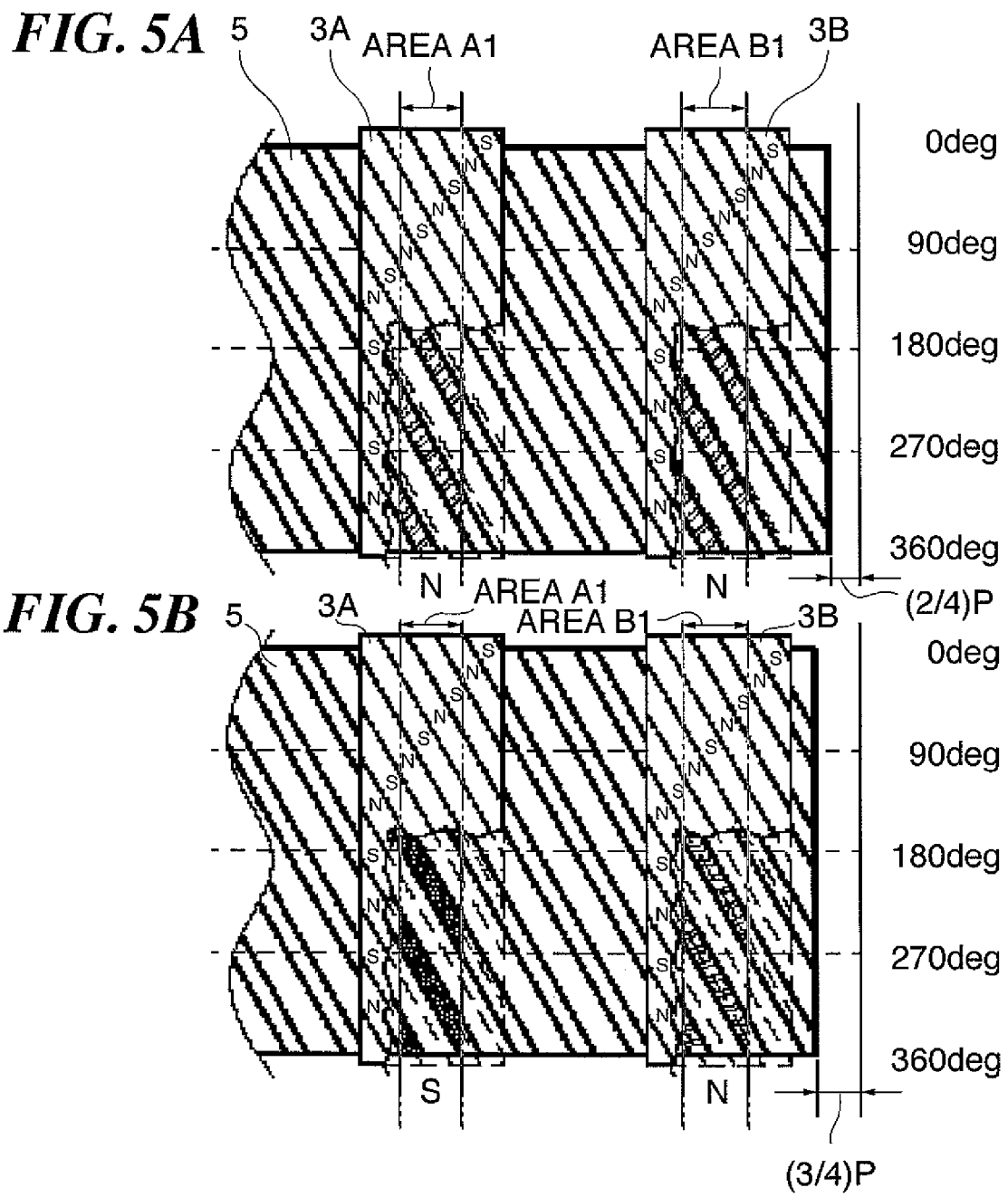

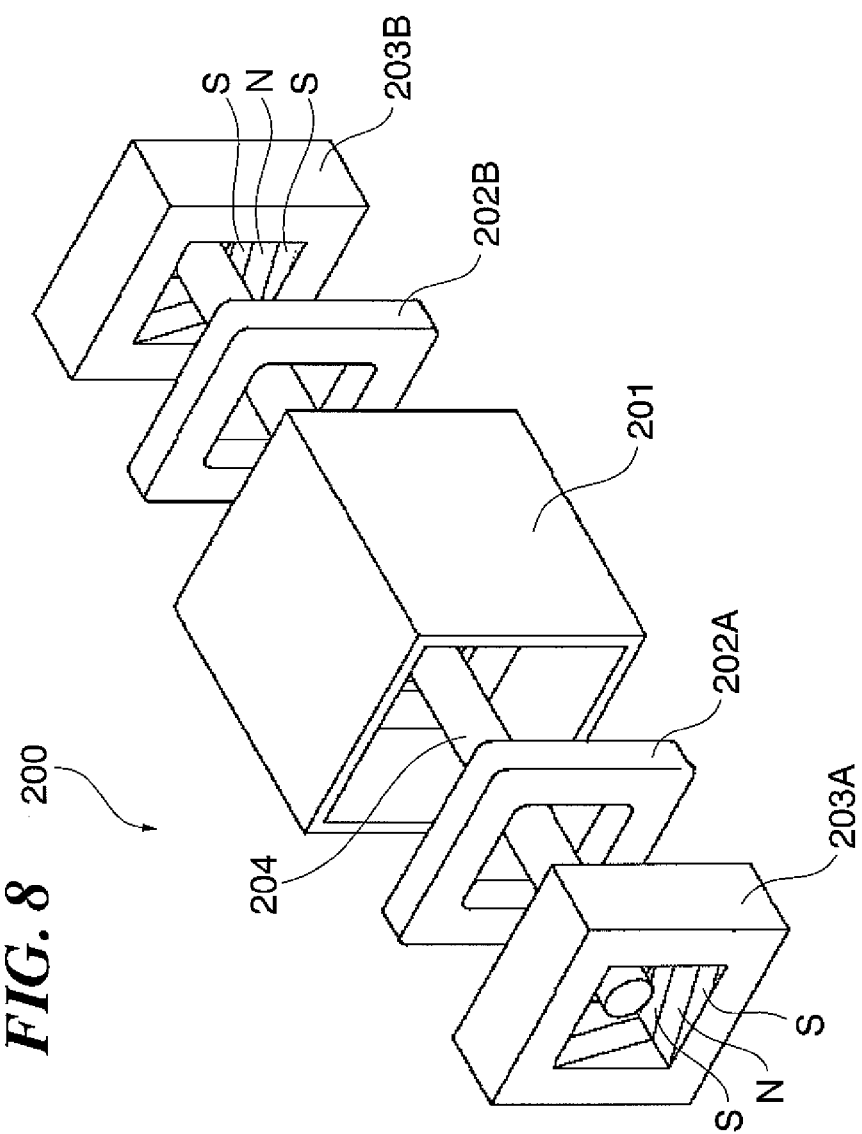
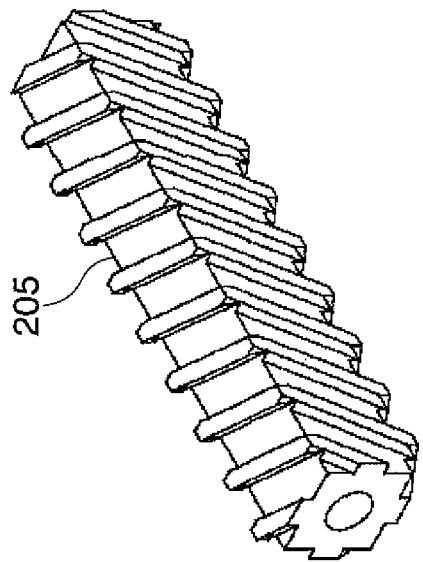
FIG. 8

DRIVING DEVICE

BACKGROUND OF THE INVENTION

1. Field of the Invention

The present invention relates to a driving device which is applied to a linear drive motor.

2. Description of the Related Art

Linear drive motors have been used in various fields of industry such as camera lens motion, mechanism positioning in machine tools, and slide seat motion in automobiles. As a first example of the prior art linear drive motor, there is a shaft moving type motor shown in FIG. 11 (see e.g. Japanese Laid-Open Patent Publication (Kokai) No. H06-078494).

FIG. 11 is a perspective view of the shaft moving type motor according to the first example of prior art.

In FIG. 11, the shaft moving type motor 400 is comprised of a screw member 411 having a thread, and a motor casing 403 accommodating a stator and a rotor that has a rotor shaft formed at its inner periphery with a spiral groove for engagement with the thread on the screw member 411. The screw member 411 is prohibited from rotating by a detent 421 provided at the motor casing 403 and adapted to be engaged with an elongated groove 420 axially formed in the screw member 411. With normal and reverse rotation of the rotor, the screw member 411 can be axially reciprocated.

However, in the shaft moving type motor 400, the screw member 411 and the stator are in mechanical contact with each other, and therefore, there is the problem that wear and noise are easily caused and the screw member 411 cannot be moved at a high speed. In this regard, there is proposed a second example of the prior art motor (see e.g. Japanese Patent No. 3434430).

FIG. 12 is a perspective view showing a configuration of the second example of the prior art motor.

In FIG. 12, the motor 500 is comprised of a motor shaft 502 having a magnet 501 which has an outer peripheral surface thereof provided with a plurality of band-shaped spiral magnetized portions, and a stator 511 having an inner peripheral surface on which spiral ridges are formed after the spiral magnetized portions. The motor 500 generates a rotating magnetic field by sequentially switching directions of current supply to coils (not shown) wound around an outer peripheral surface of the stator 511, thereby causing the magnet 501 to move rectilinearly in an axial direction or rotate around an axis of the stator 511 to follow the spiral ridges formed at a magnetic pole part 512.

With the above described motor 500 where the magnet 501 can be moved out of contact with the stator 511, high speed movement of the magnet 501 can be achieved while causing less wear and noise.

However, the motor 500 requires forming the magnet pole part 512 in the complicated spiral shape on the inner peripheral surface of the stator 511 after the spiral magnetized portions of the magnet 501. This poses the problem that the motor 500 is difficult to manufacture using a machining method suitable for mass production, making it difficult to achieve cost reduction. Besides the axial length of the magnet 501 requires to be equal to the required rectilinear moving amount of the motor shaft at the minimum, and therefore, the magnet 501 becomes long when the required rectilinear moving amount of the motor shaft 502 is large.

When manufacturing the magnet, there are needed a magnetizing yoke having magnetic pole teeth which have nearly the same length as the magnet and a similar shape to that of the magnetized portions of the magnet, and a coil for exciting the magnetizing yoke. Therefore, when the angle which defines the spiral shape of the magnetized portions, namely, the angle θ at which the ridges of the magnetic pole part 512 extend relative to the axis of the stator 511 is made small (see FIG. 12) in order to manufacture the long magnet 501, the magnetizing yoke becomes difficult to manufacture. Especially when the spiral magnetized portions extend for a longer length than the entire circumference of the motor shaft, it becomes difficult to wind the coil on the magnetizing yoke, resulting in ununiform coil winding or the like which poses problems that a variation in permanent magnetization easily occurs, casing a variation in motor torque and increase in cost. Therefore, the above-mentioned angle θ preferably has a large value when manufacturing a long magnet.

In FIG. 12, a force f exerted on the magnet 501 from the stator 511 when the motor 500 is driven is comprised of an axial force component f1 and a perpendicular force component f2. When the magnet 501 is moved, the axial force component f1 provides a propulsive force for the rectilinear movement. Therefore, in order to increase the propulsive force for the rectilinear movement of the magnet 501, a propulsive force for the rotational movement (the perpendicular force component f2) must be small. Consequently, the inclination angle θ of the magnetic pole part 512 relative to the axis of the stator 511, namely, the inclination angle θ of the magnetized portions of the magnet 501 relative to the axis of the magnet 501 preferably has a small value.

With decrease in the inclination angle θ, however, the width of the ridges of the magnetic pole part 512 becomes smaller, and as a result, a sufficient mechanical strength of the motor 500 cannot be secured.

As described in detail above, the inclination angle θ which satisfies the requirements of both the propulsive force for the rectilinear movement of the magnet 501 and the mechanical strength of the motor 500 is difficult to attain in practice, and therefore, it is difficult to manufacture the motor 500 including the long magnet 501. Further, the motor 500 requires the stator coils disposed radially outwardly of the magnet 501, which is disadvantageous for reduction in motor diameter.

SUMMARY OF THE INVENTION

It is a first object of the present invention to provide a driving device easy to manufacture.

It is a second object of the present invention to provide a driving device capable of increasing a propulsive force exerting in a direction of a motor shaft.

It is a third object of the present invention to provide a driving device capable of realizing reduction in diameter.

To attain the above first and second objects, in a first aspect of the present invention, there is provided a driving device comprising a slider formed of a soft magnetic material and having at least one spiral member disposed along a predetermined axial direction, a stator formed of a soft magnetic material and supporting the slider movably along the predetermined axial direction, a first coil fixed to the stator, for at least partially magnetizing a first area of the spiral member, a second coil fixed to the stator, for at least partially magnetizing a second area of the spiral member, a first magnet fixed to the stator and having a magnetized surface thereof opposed to the first area and magnetized in a shape corresponding to a shape of the spiral member, and a second magnet fixed to the stator and having a magnetized surface thereof opposed to the second area and magnetized in a shape corresponding to the shape of the spiral member.

According to the above described arrangement, since the first and second magnets have the magnetized surfaces magnetized in the shape corresponding to the shape of the spiral member of the slider, the axial lengths of the first and second magnets can be reduced, and manufacture of the driving device including the first and the second magnets is facilitated. With reduction in the axial lengths of the first and second magnets, the angle of the magnetic poles formed on the magnetized surfaces of the first and second magnets with respect to the axial direction are easily made small, whereby the driving device can increase the propulsive force acting on the slider.

Preferably, the slider is disposed inside the stator.

Alternatively, the slider is disposed outside the stator.

Preferably, the first and the second magnets are each formed into a cylindrical shape.

Alternatively, the first and the second magnets are each formed into a hollow rectangular column shape.

Preferably, each of the magnetized surfaces of the first and second magnets has a predetermined number of magnetic poles, and the spiral member of the slider includes as many ridges as half the predetermined number of the magnetic poles of each of the first and second magnets.

In order to attain the above described third object, preferably the first and second coils and the first and second magnet are arranged coaxially in the axial direction, coaxially with one another.

Preferably, the driving device further comprises an object holder for holding an object, the object holder being movable in unison with the slider of the driving device.

Preferably, the object is a camera lens.

The above and other objects, features, and advantages of the invention will become more apparent from the following detailed description taken in conjunction with the accompanying drawings.

BRIEF DESCRIPTION OF THE DRAWINGS

FIG. 4A is a developed view showing the slider in a state when an area A1 in FIG. 3B is magnetized to an S pole and an area B1 is magnetized to an S pole;

FIG. 4B is a developed view showing a state when the area A1 of the slider is magnetized to an N pole and the area B1 is magnetized to an S pole;

FIG. 5A is a developed view showing a state when the area A1 of the slider is magnetized to an N pole and the area B1 is magnetized to an N pole;

FIG. 5B is a developed view showing a state when the area A1 of the slider in FIG. 5A is magnetized to an S pole and the area B1 is magnetized to an N pole;

FIG. 8 is an exploded perspective view showing a configuration of a motor as a driving device according to a third embodiment of the present invention;

DETAILED DESCRIPTION OF THE PREFERRED EMBODIMENTS

The present invention will now be described in detail below with reference to the accompanying drawings showing preferred embodiments thereof.

Figure 1:
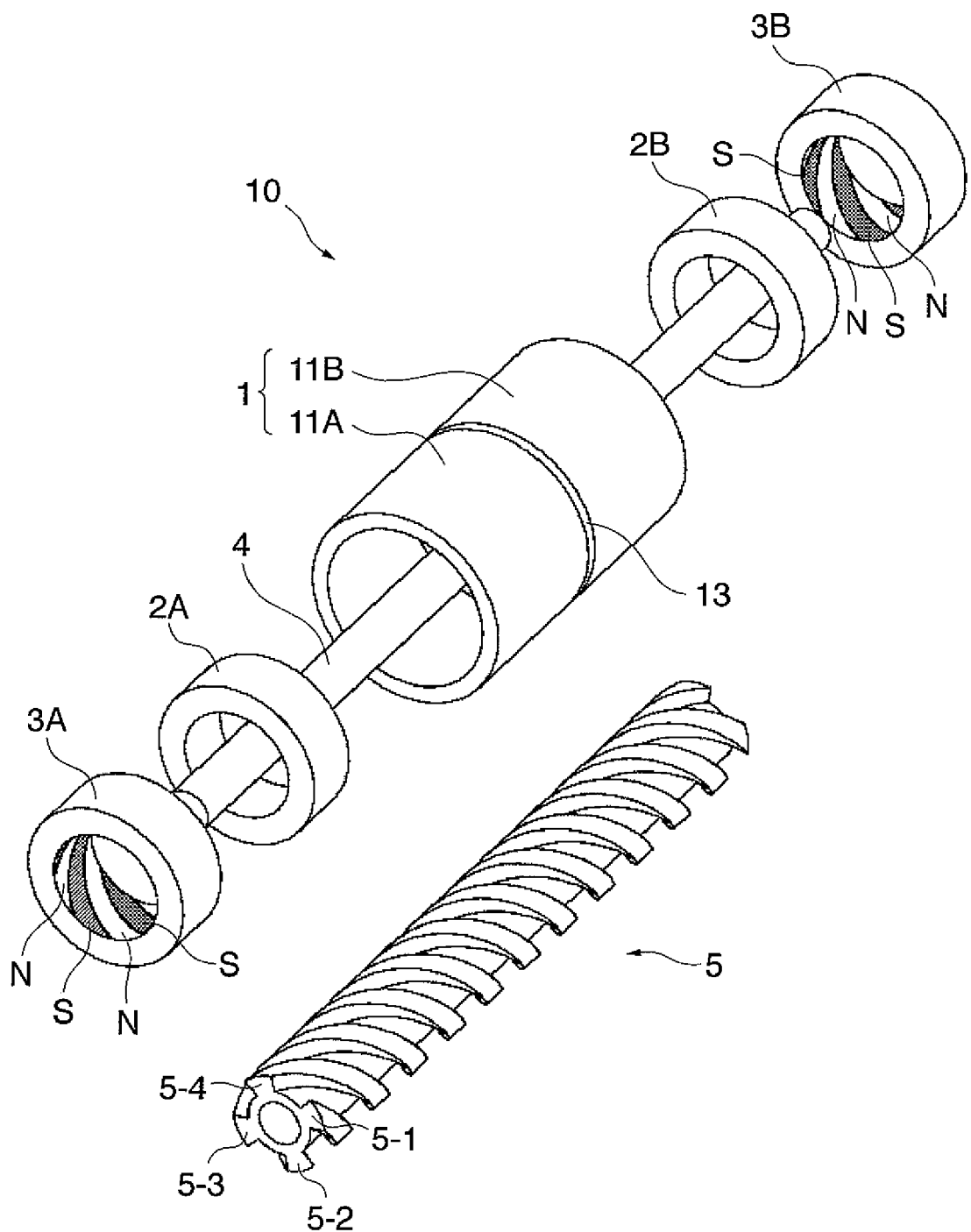
FIG. 1 is an exploded perspective view showing a configuration of a motor as a driving device according to a first embodiment of the present invention.
Figure 2:
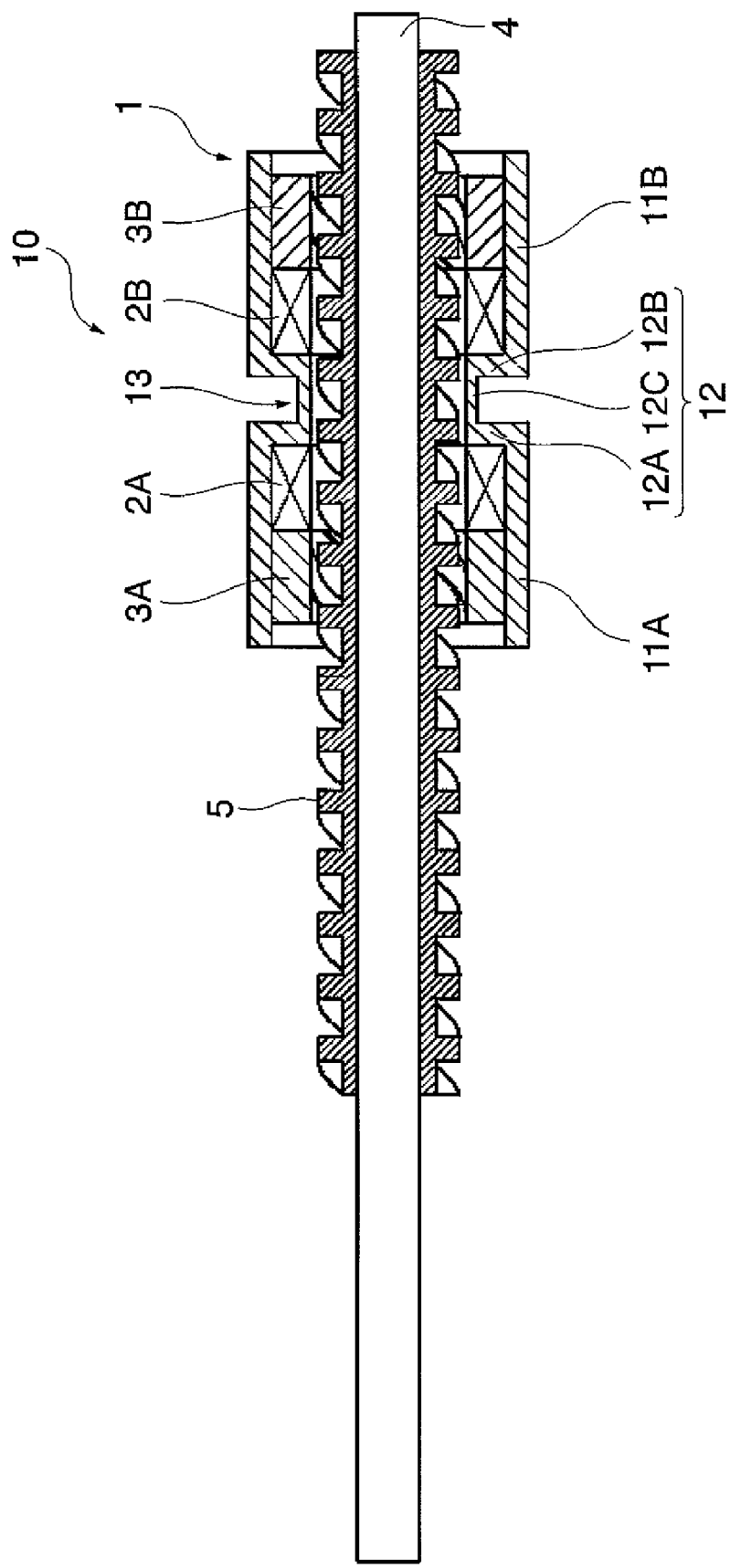
FIG. 2 is an axial sectional view of the linear motor in an assembled state.

FIG. 1 is an exploded perspective view showing a configuration of a linear motor as a driving device according to a first embodiment of the present invention. FIG. 2 is an axial sectional view of the linear motor in an assembled state.

In FIGS. 1 and 2, the linear motor 10 is comprised of a stator yoke 1, a first coil 2A, a second coil 2B, a first magnet 3A, a second magnet 3B, a support bar 4, and a slider 5.

The stator yoke 1 is formed of a soft magnetic material, is formed into a hollow cylindrical shape, and supports the slider 5 to be movable in an axial direction of the support bar 4. The stator yoke 1 is separated into a first outer yoke 11A and a second outer yoke 11B by a groove 13 that is circumferentially formed in an axially central part of an outer peripheral surface of the stator yoke 1. A partition plate 12 which defines the groove 13 of the stator yoke 1 is formed into a U-shape in cross section and comprised of a first and second radially extending magnetic flux transmission plates 12A, 12B and a connecting part 12C provided between them. It should be noted that the connecting part 12C is desirably made as thin as possible in a thickness range in which its mechanical strength and function of preventing magnetic interference between the first coil 2A and the second coil 2B are not impaired.

The first coil 2A has a conductor wire annularly wound thereon, and excites magnetic pole parts of the slider 5. The first coil 2A is disposed coaxially with the stator yoke 1, and has its outside diameter set to a dimension substantially equal to the inside diameter of the stator yoke 1.

The second coil 2B has a conductor wire annularly wound thereon, and excites the magnetic pole parts of the slider 5. The second coil 2B is the same in shape as the first coil 2A, is disposed coaxially with the stator yoke 1, and has its outside diameter set to a dimension substantially equal to the inside diameter of the stator yoke 1.

The first magnet 3A formed into a hollow cylindrical shape has an inner peripheral surface thereof provided with n (in this embodiment, n=8) magnetized portions that are magnetized spirally and alternately into S poles and N poles.

The second magnet 3B has the same cylindrical shape as the first magnet 3A and has an inner peripheral surface thereof provided with n (in this embodiment, n=8) magnetized portions that are magnetized spirally and alternately into S poles and N poles.

The support bar 4 is formed of a non-magnetic material, and supports the slider 5 slidably in the axial direction by being fitted into an inner hole of the slider 5. As shown in FIG. 2, the first coil 2A, the first magnet 3A, the second coil 2B, and the second magnet 3B are fixed on an inner peripheral surface of the stator yoke 1 coaxially with and parallel to the axis of the support bar 4. The support bar 4 and the stator yoke 1 are coaxially fixed with each other to construct the stator of the motor 10. An electrical phase difference between the first magnet 3A and the second magnet 3B is set to a predetermined angle as will be described later.

The slider 5 is made of a soft magnetic material, is formed into a substantially hollow cylindrical shape, and has an outer periphery thereof formed with a multiple-start thread having a plurality of spiral ridges (screw threads). The axial length of the slider 5 is set to be longer than the maximum moving amount of the slider 5 required of the motor 10, namely, the distance by which the motor 10 is capable of driving the slider 5 in the axial direction. The number of thread starts of the slider 5 is set at the half of the number n of the magnetized portions (hereinafter called "the number of magnetic poles") of each of the first and second magnets 3A, 3B. The respective screw threads of the multiple start thread form magnetic pole parts. The magnetic pole parts are assigned with reference numerals 5-1, 5-2, ..., 5-($n/2$) as shown in FIGS. 3B and 3C. The outside diameter of the screw threads is set to be slightly smaller than the inside diameter of the first and second magnets 3A, 3B. The inclination angle of the screw threads relative to the axis of the slider 5 is set to be the same as the inclination angle (defining the spiral shape) of the magnetized portions of each of the first magnet 3A and the second magnet 3B relative to the axis of the magnets.

The inside diameter of the slider 5 is set to the dimension substantially equal to the outside diameter of the support bar 4, and as shown in FIG. 2, the slider 5 is supported on the support bar 4. Thus, the slider 5 is capable of relative movement with respect to the stator comprised of the support bar 4 and the stator yoke 1, namely, rectilinear movement in the axial direction. In the state in which the slider 5 is supported by the stator, the magnetic pole parts 5-1, 5-2, ..., 5-($n/2$) of the slider 5 are partially opposed to the magnetized portions of the first magnet 3A and the second magnet 3B.

Next, the principle of moving the slider 5 relative to the stator in the motor 10 having the above construction will be described with reference to FIGS. 3A to 3C.

The slider 5 is rectilinearly moved along the support bar 4 by the interaction between the stator and the slider 5 when the first coil 2A and the second coil 2B are excited, as described in detail below.

Figure 3A:
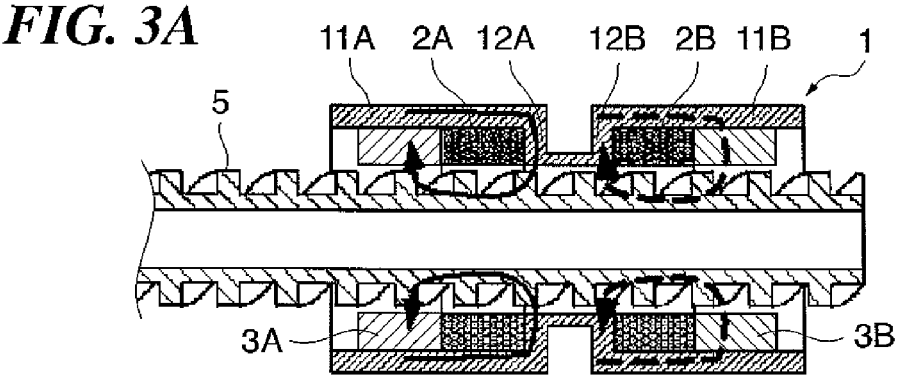
FIG. 3A is a sectional view showing a magnetic path of magnetic fluxes generating from a first coil and a second coil of the motor in FIG. 1.
Figure 3B:
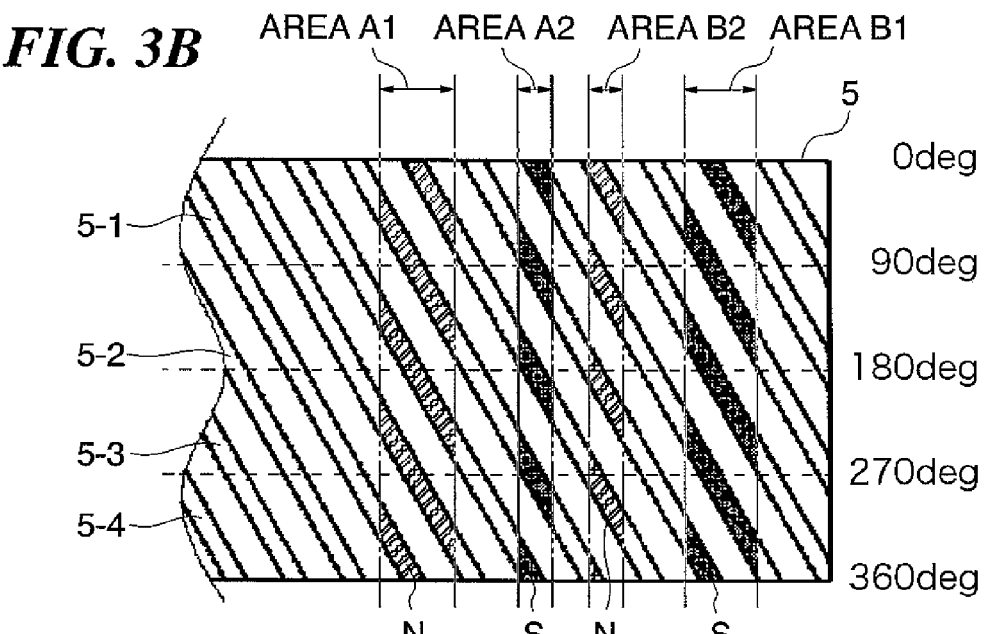
FIG. 3B is a developed view showing a slider of FIG. 1 in an excited state.
Figure 3C:
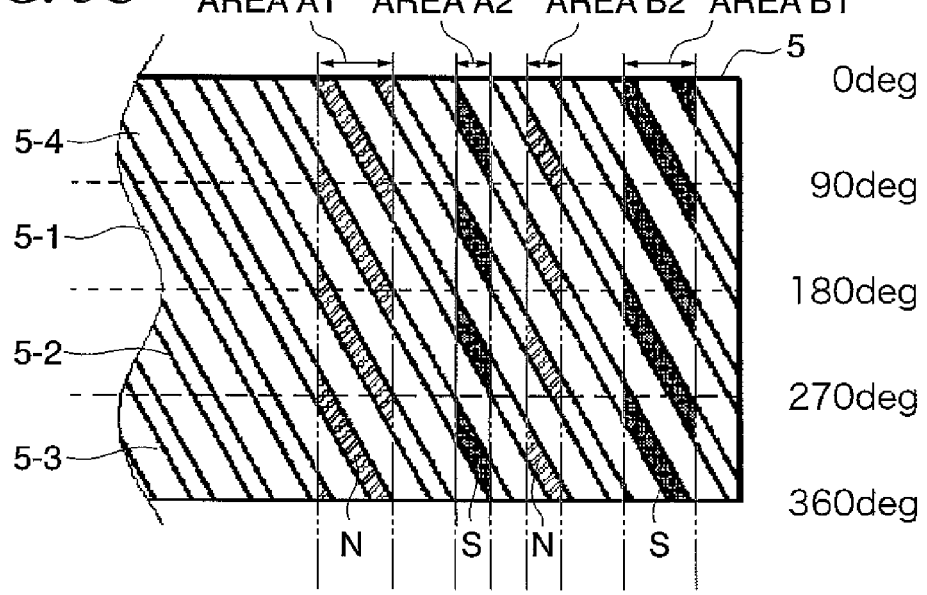
FIG. 3C is a developed view showing a state after the slider is moved in the axial direction from the state shown in FIG. 3B.

FIG. 3A is a sectional view showing magnetic paths of magnetic fluxes generating from the first coil 2A and the second coil 2B of the motor 10. In FIG. 3A, the conductor wires wound on the first coil 2A and the second coil 2B are collectively shown in cross section. FIG. 3B is a developed view showing the slider 5 in an excited state, and FIG. 3C is a developed view showing a state after the slider 5 is moved in the axial direction from the state shown in FIG. 3B.

As shown in FIG. 3A, the magnetic flux generated by energizing the first coil 2A passes through the first outer yoke 11A and the first flux transmission plate 12A of the stator yoke 1, the slider 5, and the first magnet 3A, which cooperate to form a magnetic path in a loop around the first coil 2A. As a result, an area A1 (FIG. 3B) of the slider 5 opposed to the first outer yoke 11A and the first magnet 3A, and an area A2 (FIG. 3B) of the slider 5 opposed to the first flux transmission plate 12A are magnetized to the reverse poles from each other.

Magnetic flux naturally concentrates on the place with less magnetic resistance, and therefore, the magnetic flux shown in FIG. 3A highly magnetizes the screw threads, i.e., the magnetic pole parts 5-1, 5-2, ..., and 5-($n/2$) in the area A1 where a clearance between the outer peripheral surface of the slider 5 and the first magnet 3A is narrower than in the remainder of the area A1 of the slider 5. The hatched portions in FIG. 3B show portions of the magnetic pole parts where the slider 5 is highly magnetized. This applies to the area A2 of the slider 5.

By switching the direction of energization of the first coil 2A, those portions of the magnetic pole parts 5-1, 5-2, ..., and 5-($n/2$) of the slider 5 which are in the areas A1 and A2 can be magnetized to desired poles, respectively. When the second coil 2B is energized, those portions of the magnetic pole parts 5-1, 5-2, ..., and 5-($n/2$) of the slider 5 which are in the areas B1 and B2 can be magnetized to desired poles, respectively, independently of the magnetization of the magnetic pole parts in the areas A1 and A2.

In this embodiment, for simplification of assembly of the motor 10 and reduction in the number of components of the motor 10, the first outer yoke 11A and the second outer yoke 11B of the stator yoke 1 are integrally constructed, but the present invention is not limited to this. When the magnetic interference between the first coil 2A and the second coil 2B is large, the first outer yoke 11A and the second outer yoke 11B of the stator yoke 1 can be separately constructed.

In FIG. 3C, as in the case of FIG. 3B, the magnetic flux generated by energizing the first coil 2A passes through the first outer yoke 11A, the first magnetic flux transmission plate 12A, the slider 5, and the first magnet 3A, which cooperate to form a magnetic path in a loop around the first coil 2A. As a result, those portions of the magnetic pole parts 5-1, 5-2, and 5-($n/2$) of the slider 5 which are in the areas A1 and A2, namely, the hatched portions shown in FIG. 3C are highly magnetized. In FIG. 3C, the portions in which the slider 5 is highly magnetized are deviated in phase or in axial position from those shown in FIG. 3B.

The axial positions of those portions of the areas A1, A2, B1 and B2 of the slider 5 which are highly magnetized are determined by the shape of the stator yoke 1, the axial lengths of the first coil 2A and the second coil 2B, and the shape of the slider 5, irrespective of the axial position of the slider 5. This indicates that, even if the slider 5 moves in the axial direction, the areas A1, A2, B1 and B2 to be magnetized do not move in the axial direction. When the slider 5 moves in the axial direction, there occurs a change in the positional relationship between the areas A1, A2, B1 and B2 and the magnetic pole parts 5-1, 5-2, ..., and 5-($n/2$), thus changing the phases of the highly magnetized portions.

Next, the axial motion of the slider 5 caused when it is magnetized by energizing the first coil 2A and the second coil 2B will be described with reference to FIGS. 4A to 5B.

FIG. 4A is a developed view showing a state when the area A1 of the slider 5 is magnetized to an S pole and the area B1 is magnetized to an S pole, and FIG. 4B is a developed view showing a state when the area A1 of the slider 5 is magnetized to an N pole and the area B1 is excited to an S pole. FIG. 5A is a developed view showing a state when the area A1 of the slider 5 is magnetized to an N pole and the area B1 is magnetized to an N pole, and FIG. 5B is a developed view showing a state when the area A1 of the slider 5 is magnetized to an S pole and the area B1 is magnetized to an N pole.

FIGS. 4A to 5B show the positional relationship between the magnetized slider 5 and the first and second magnets 3A, 3B. In FIGS. 4A to 5B, the developed view of the slider 5 seen from the outer peripheral side and the developed view of the magnetized surfaces of the first and second magnets 3A, 3B seen from the inner peripheral side are overlaid upon each other. For convenience of illustration of the positional relationship between the slider 5 and the magnetized portions, the first magnet 3A and the second magnet 3B are partially cut away. Illustration of the magnetized areas A2 and B2 of the slider 5 is omitted since these areas do not have an effect on drive of the slider 5 by the motor 10.

As shown in FIG. 4A, a magnetization pitch P' indicating the distance between adjacent N poles or adjacent S poles which are arranged on the magnetized surfaces of the first magnet 3A and the second magnet 3B at regular intervals is equal to a pitch P indicating the distance between the adjacent magnetic pole portions 5-1, 5-2, ..., 5-($n/2$) of the slider 5. It is desirable to make the screw threads (magnetic pole part) of the slider 5 small in width as compared with the root portions. The electrical phase difference between the first magnet 3A and the second magnet 3B corresponds to the distance that is equal to ¼ of the magnetization pitch P'.

FIG. 4A shows a stable state achieved when the area A1 of the slider 5 is magnetized to an S pole by energizing the first coil 2A in the reverse direction opposite to the normal direction and the area B1 of the slider 5 is magnetized to an S pole by energizing the second coil 2B in the reverse direction opposite to the normal direction. In the state shown in FIG. 4A, a balance is reached in the magnetic interaction between the excited magnetic pole parts of the slider 5 and the first and second magnets 3A, 3B. Therefore, the position shown in FIG. 4A is a stabilization point of the slider 5 when the slider area A1 and B1 are magnetized to S poles.

FIG. 4B shows the next stable state of the slider 5 transited from the stable state of FIG. 4A, the next stable state being achieved by magnetizing the areas A1 and B1 to an N pole and an S pole, respectively, by energizing the first coil 2A in the normal direction and energizing the second coil 2B in the reverse direction. In the state shown in FIG. 4B, a balance is reached in the magnetic interaction between the excited magnetic pole parts of the slider 5 and the first and second magnets 3A, 3B. The position shown in FIG. 4B becomes the stabilization point of the slider 5 when the slider area A1 and B1 are magnetized to N and S poles, respectively. The axial position shown in FIG. 4B is a position to which the slider 5 has advanced to the left in FIG. 4B by the distance equal to ¼ of the magnetization pitch P' from the position shown in FIG. 4A.

FIG. 5A shows the next stable state of the slider 5 transited from the stable state of FIG. 4B, the next stable state being achieved by magnetizing each of the areas A1 and B1 to an N pole by energizing the first and second coils 2A, 2B in the normal direction. The axial position to which the slider 5 has advanced in the axial direction (left direction) by the distance (¼) P from the position of FIG. 4B is the next stabilization point of the slider 5. The distance between the axial positions of the slider 5 shown in FIGS. 4A and 5A is equal to one-half (2/4) of the pitch P.

FIG. 5B shows the next stable state of the slider 5 achieved by magnetizing the areas A1 and B1 to an S pole and an N pole by energizing the first and second coils 2A, 2B in the reverse and normal directions, respectively. The axial position in FIG. 5B to which the slider 5 has advanced by the distance (¼)P in the axial direction (left direction) from the position in FIG. 5A is the next stabilization point of the slider 5. The distance between the positions of the slider 5 shown in FIGS. 4A and 5B is equal to three-fourth (¾) of the pitch P.

As described above, by sequentially and alternately switching the energizing directions of the first coil 2A and the second coil 2B, the slider 5 can be rectilinearly moved in one axial direction in increments equal to ¼ of the magnetization pitch P'.

During the rectilinear movement, as a result of the magnetic interaction, the slider 5 receives from the magnets 3A and 3B a force exerting in the direction (shown by the arrow F in FIG. 4A) orthogonal to the screw threads of the slider 5 which form the magnetic pole parts 5-1 to 5-4. As a result, the slider 5 rectilinearly moves in the axial direction while rotating around the axis of the stator yoke 1, thus performing a spiral movement relative to the stator yoke 1. By providing a detent at the stator yoke 1, it is possible to restrict the rotational movement of the slider 5, so that the slider 5 may rectilinearly move only in the axial direction. In this case, as the angle formed between the direction F of the force exerting on the slider 5 from the magnets 3A and 3B and the traveling direction of the slider 5 is closer to 0°, the propulsive force for the rectilinear movement of the slider 5 by the motor 10 can be increased, namely, utilization efficiency of the magnetic energy can be enhanced.

As described above, according to the present embodiment, the slider 5 of the motor 10 is comprised of a multiple start thread screw whose screw threads can be formed by a machining method suitable for mass production such as rolling. In addition, magnetic pole parts can be formed by simply magnetizing the screw threads. This makes it possible to provide the motor 10 having magnetic pole parts that can be easily manufactured.

In the present embodiment, the magnets (magnetized portions) are disposed on the side not close to the slider as in the prior art, but close to the stator as viewed radially of the motor. As a result, it is possible to make the axial lengths of the magnetized surfaces of the first magnet 3A and the second magnet 3B smaller than the rectilinearly moving amount of the slider 5. The magnets 3A and 3B shorter in axial length than the slider 5 can be easily magnetized, making it possible to provide the motor 10 having the magnets 3A and 3B that are easy to manufacture.

Since the multiple thread screw constructing the slider 5 can be manufactured by an established machining method as described above, the mechanical strength of the magnetic pole parts formed by the screw threads is not greatly decreased even if the angle of the screw threads with respect to the axial direction is made small. Conversely, even if the angle is made large, the magnetic pole parts do not interfere with each other.

Since the magnetized portions are formed on the magnets 3A and 3B which are short in the axial direction as described above, the angle (inclination) which defines the spiral shape of the magnetized portions of the magnets 3A and 3B with respect to the axial direction can be easily made large. This makes it possible to provide the motor 10 with a large propulsive force for the rectilinear movement of the slider 5.

Further, since the magnets 3A and 3B are short in the axial direction as described above, even if the inclination of the magnetized portions of the magnets 3A and 3B with respect to the axial direction is made small, the length of the magnetized portion does not become too large. Therefore, the coils 2A and 2B used for magnetizing the magnets 3A and 3B can be short in length, making it easy to manufacture the magnets 3A and 3B with small inclinations of the magnetized portions with respect to the axial direction. As a result, the force component acting in the traveling direction of the slider 5 can be increased. This makes it possible to provide the motor 10 with a large propulsive force in the axial direction of the slider 5.

Further, the first coil 2A, the second coil 2B, the first magnet 3A, and the second magnet 3B are disposed side by side or coaxially in the axial direction and in parallel with the axial direction. Therefore, the radial dimension of the motor 10 can be made equal, at the minimum, to the sum of the thickness of the magnetic pole part and the thickness of the magnet. Further, the coaxial arrangement can eliminate the necessity of winding the coil around the outer peripheral surface of the magnet as in the prior art. This makes it possible to provide the motor 10 capable of achieving reduction in diameter.

As understood from the above description, it is possible to provide the motor 10 easy to manufacture and capable of producing a large propulsive force in the axial direction of the motor shaft and realizing reduction in diameter.

Figure 6:
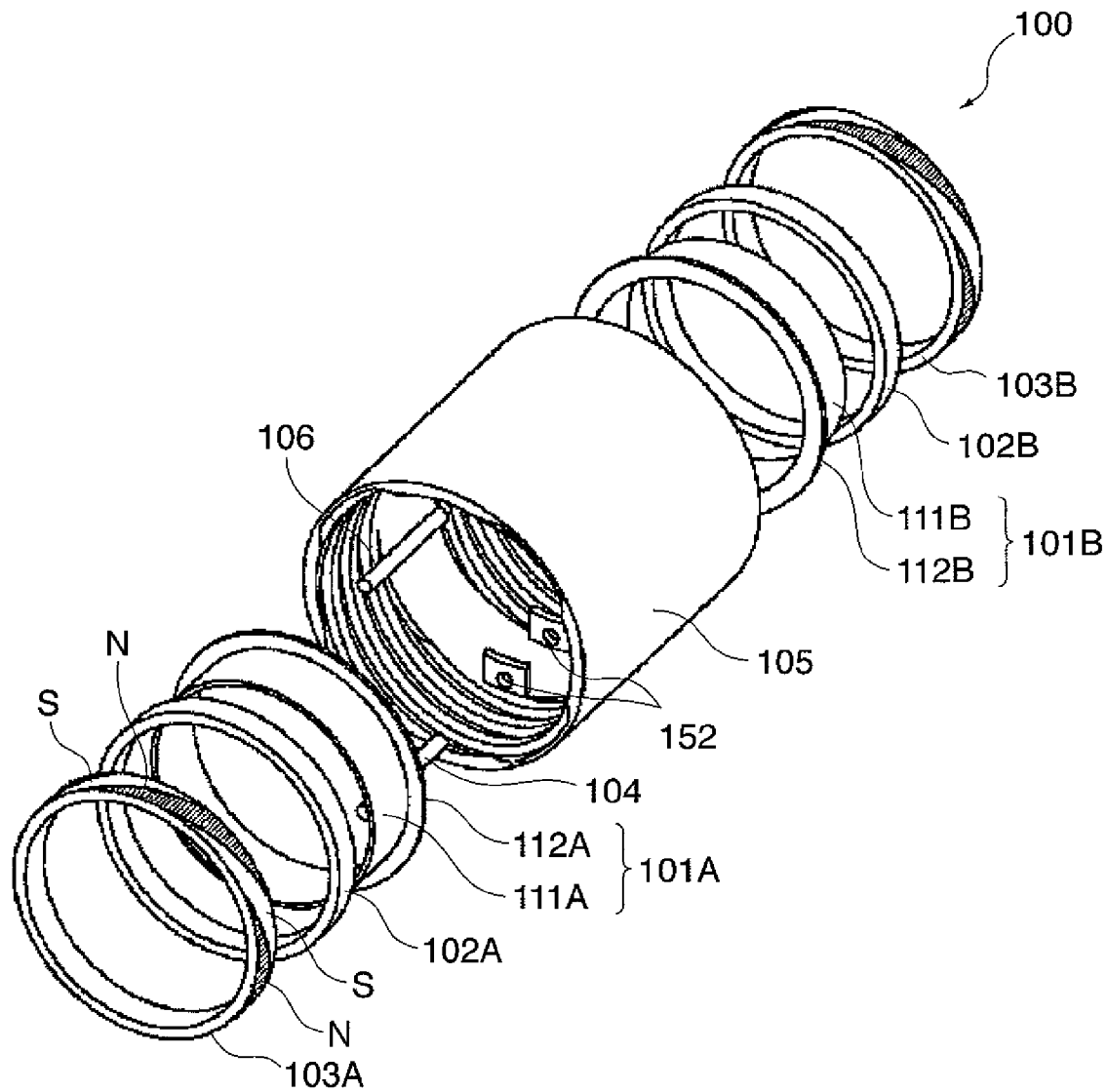
FIG. 6 is an exploded perspective view showing a configuration of a motor as a driving device according to a second embodiment of the present invention.
Figure 7:
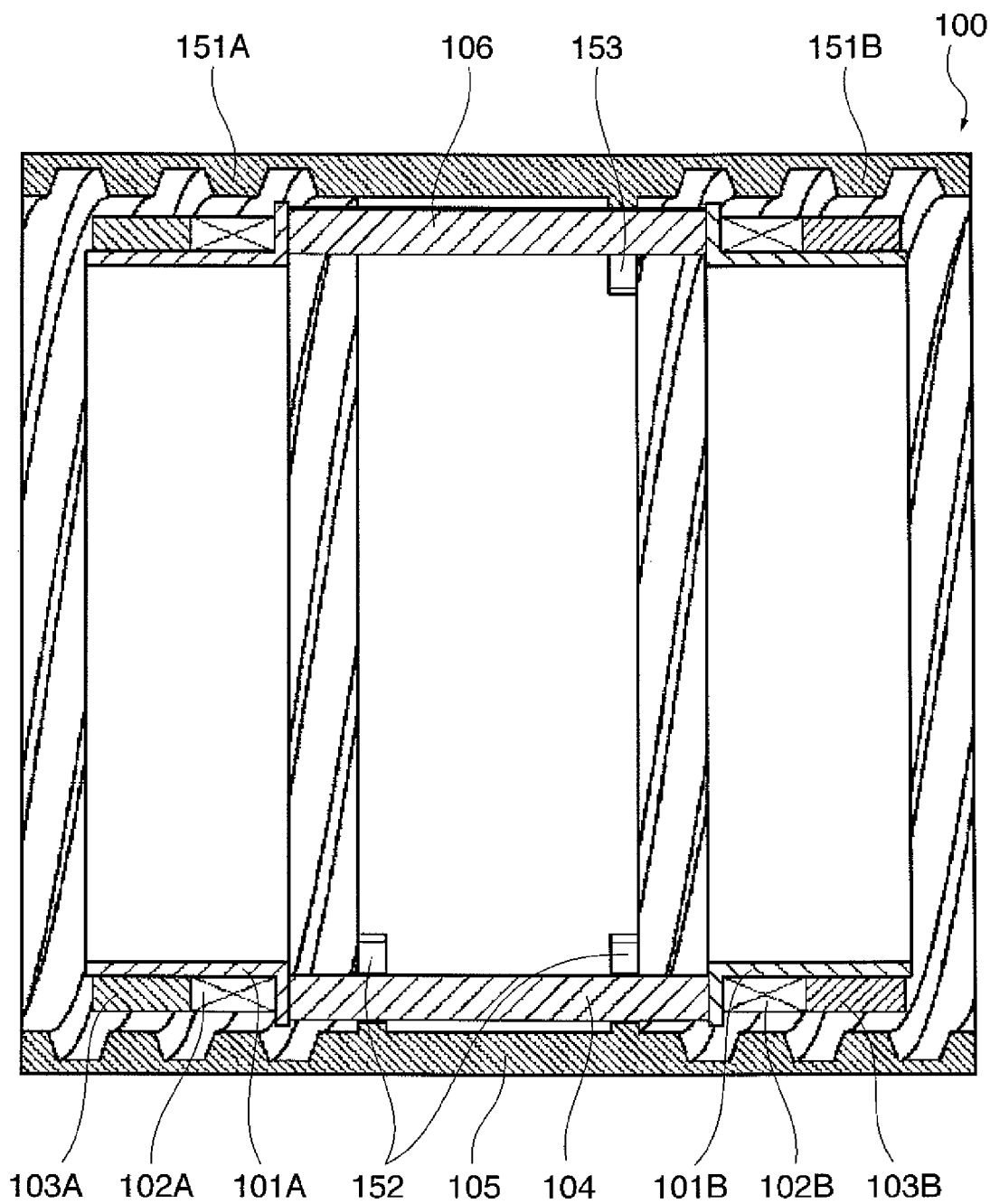
FIG. 7 is an axial sectional view showing a structure of the motor in an assembled state.

FIG. 6 is an exploded perspective view of a linear motor as a driving device according to a second embodiment of the present invention. FIG. 7 is an axial sectional view showing the motor in an assembled state.

In FIGS. 6 and 7, the motor 100 is comprised of a first stator yoke 101A, a second stator yoke 101B, a first coil 102A, a second coil 102B, a first magnet 103A, a second magnet 103B, a support bar 104, a slider 105, and a detent bar 106.

The first stator yoke 101 is formed of a soft magnetic material and formed into a hollow cylindrical shape. The first stator yoke 101A is comprised of a first inner yoke 111A and a first magnetic flux transmission plate 112A. The second stator yoke 101B is formed of a soft magnetic material and formed into the same cylindrical shape as the first stator yoke 101A. The second stator yoke 101B is comprised of a first inner yoke 111B and a first magnetic flux transmission plate 112B.

The first coil 102A is wound around an outer peripheral surface of the first stator yoke 101A. The second coil 102B is wound around an outer peripheral surface of the second stator yoke 101B.

The first magnet 103A, which is formed into a cylindrical shape, has its outer peripheral surface provided with n (in this embodiment, n=8) magnetized portions which are magnetized spirally and alternately into S poles and N poles. The second magnet 103B is formed into the same cylindrical shape as the first magnet 103A and has its outer peripheral surface provided with n (in this embodiment, n=8) magnetized portions which are magnetized spirally and alternately into S poles and N poles.

The support bar 104 and the detent bar 106 are components for fixing the first stator yoke 101A and the second stator yoke 101B on an inner peripheral surface of the slider 105 as shown in FIG. 7.

The slider 105 is formed of a soft magnetic material and formed into a cylindrical shape. The slider 105 has its inner periphery provided with a first magnetic pole part 151A and a second magnetic pole part 151B that are formed by ridges (screw threads) of a multiple start internal thread. The first magnetic part 151A is opposed to the first magnet 103A, and the second magnetic pole part 151B is opposed to the second magnet 103B. The number of thread starts of the ridges of the internal multiple start thread is set at the half of the number n of magnetic poles of the first and second magnets 103A, 103B. The slider 105 is provided at its inner periphery with flanges formed with support holes 152 and a flange provided with a detent 153.

As shown in FIG. 7, the first coil 102A and the first magnet 103A are fixed onto the outer peripheral surface of the first stator yoke 101A, and the second coil 102B and the second magnet 103B are fixed onto an outer peripheral surface of the second stator yoke 101B. Further, the first stator yoke 101A and the second stator yoke 101B are fixed to each other through the medium of the support bar 104 and the detent bar 106. Thereby, a stator of the motor 100 is constructed.

It should be noted that the support bar 104 is fitted into the support holes 152 to support the slider 105 to be rectilinearly movable in an axial direction of the support bar 104, and the detent bar 106 is fitted into the detent 153 to prevent the slider 105 from rotating relative to the stator.

After assembly of the motor 100, the first magnetic pole part 151A of the slider 105 is opposed to the magnetized portions of the first magnet 103A, and the second magnetic pole part 151B of the slider 105 is opposed to the magnetized portions of the second magnet 103B as shown in FIG. 7.

In the present embodiment, outer periphery magnetization is performed for magnetizing the outer peripheral surfaces of the first and second magnets 103A, 103B. As compared with the slider 5 in the above described first embodiment, the slider 105 increases in weight, but the outer periphery magnetization is easy to carry out as compared with inner periphery magnetization, making it possible to increase the number of magnetized portions of the magnet and the density of magnetic flux passing through the magnetized portions with ease compared to the first embodiment.

Further, in the present embodiment, the first magnetic pole part 151A and the second magnetic pole part 151B are constructed to be separate from each other, and therefore, the present embodiment has the characteristic of less magnetic interference between the first coil 102A and the second coil 102B. When these coils are constructed separately, a difference between the phase difference between the first magnet 103A and the first magnetic pole part 151A and the phase difference between the second magnet 103B and the second magnetic pole part 151B needs to be one-fourth (¼) of the magnetization pitch of the first magnet 103A and the second magnet 103B. There are no limitation on the phase difference between the first magnet 103A and the second magnet 103B and the phase difference between the first magnetic pole part 151A and the second magnetic pole part 151B.

Further, respective components including the slider 105 are formed into the cylindrical shape, and the support bar 104 and the detent bar 106 which are disposed inside the cylindrical elements are constructed to have small diameters, and therefore, the motor 100 of a hollow structure can be realized. This makes it possible to dispose a lens and wiring in the hollow interior of the motor 100, which is suitable for the case where a lens is driven by the motor 100.

As described above, according to the present embodiment, it becomes possible to provide the motor 100 easy to manufacture and capable of producing a large propulsive force for rectilinear movement of the slider 105 and realizing reduction in diameter.

Figure 9:
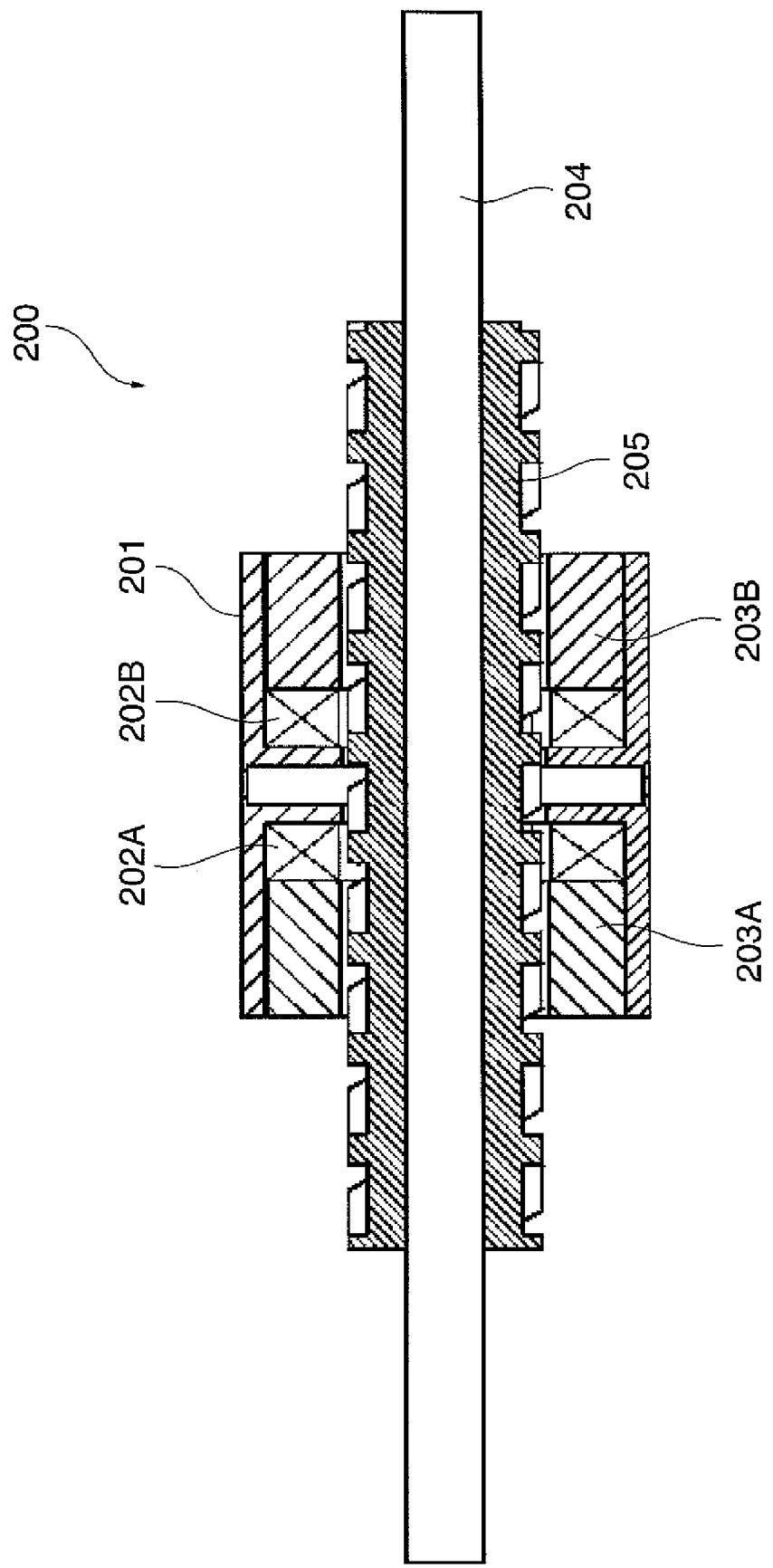
FIG. 9 is an axial sectional view showing the motor in an assembled state.

FIG. 8 is an exploded perspective view showing a linear motor as a driving device according to a third embodiment of the present invention. FIG. 9 is an axial sectional view showing the motor in an assembled state.

In FIGS. 8 and 9, the motor 200 is comprised of a stator 201, a first coil 202A, a second coil 202B, a first magnet 203A, a second magnet 203B, a support bar 204, and a slider 205.

The stator 201 is formed of a soft magnetic material, and is constructed into a hollow regular square column. The first coil 202A and the second coil 202b are respectively constructed into hollow regular square columns capable of being fitted inside the stator 201. The first magnet 203A and the second magnet 203B are respectively constructed into hollow regular square columns capable of being fitted inside the stator 201, and each have an inner peripheral surface thereof provided with n magnetized portions which are magnetized spirally and alternately into S poles and N poles.

The support bar 204 is formed of a non-magnetic material, and supports the slider 205 to be slidable in the axial direction by being fitted into an axial hole of the slider 205. The slider 205 is formed of a soft magnetic material, and is formed into a hollow square column. The slider 205 has an outer periphery thereof provided with a multiple start thread whose screw threads constitute magnetic pole parts and have the same inclination as an inclination of the screw threads of the magnetized portions of the first and second magnets 203A, 203B with respect to the axis of the motor 100.

In the above described first and second embodiments, a strong magnetic force cannot be sometimes applied to the slider due to a difficulty in magnetizing the magnets caused by the reason that the magnets are formed into a cylindrical shape. On the other hand, in the present embodiment, the first magnet 203A and the second magnet 203B are each formed into a hollow regular square column shape, and the stator 201, the first coil 202A, and the second coil 202B are also formed into the hollow regular square column shapes.

As understood from FIG. 9, the sectional structure of and the positional relationship between the respective parts of the motor 200 of the present embodiment are basically the same as those of the motor 10 of the first embodiment. Namely, in the motor 200, the first coil 202A, the second coil 202B, the first magnet 203A, the second magnet 203B, the support bar 204, and the slider 205 are disposed inside the stator 201, and the slider 205 is supported by the support bar 204 to be axially slidable thereon.

The present embodiment indicates that the magnets which construct the motor are not limited to being formed into a cylindrical shape as in the first and the second embodiments, and may be formed into a hollow regular square column shape. The first magnet 203A and the second magnet 203B in the shape of the hollow regular square column can be realized by connecting four planar (plate-shaped) magnets. With the planer magnets, the shape of the magnetizing yoke can be simplified, thus producing the advantage of easily manufacturing a strong magnet.

As described above, according to the present embodiment, it is possible to provide the motor easy to manufacture and capable of producing a large propulsive force of rectilinear movement of the slider 205 and realizing reduction in diameter.

Next, a case of application of the motor according to the first embodiment to a camera will be described.

Figure 10:
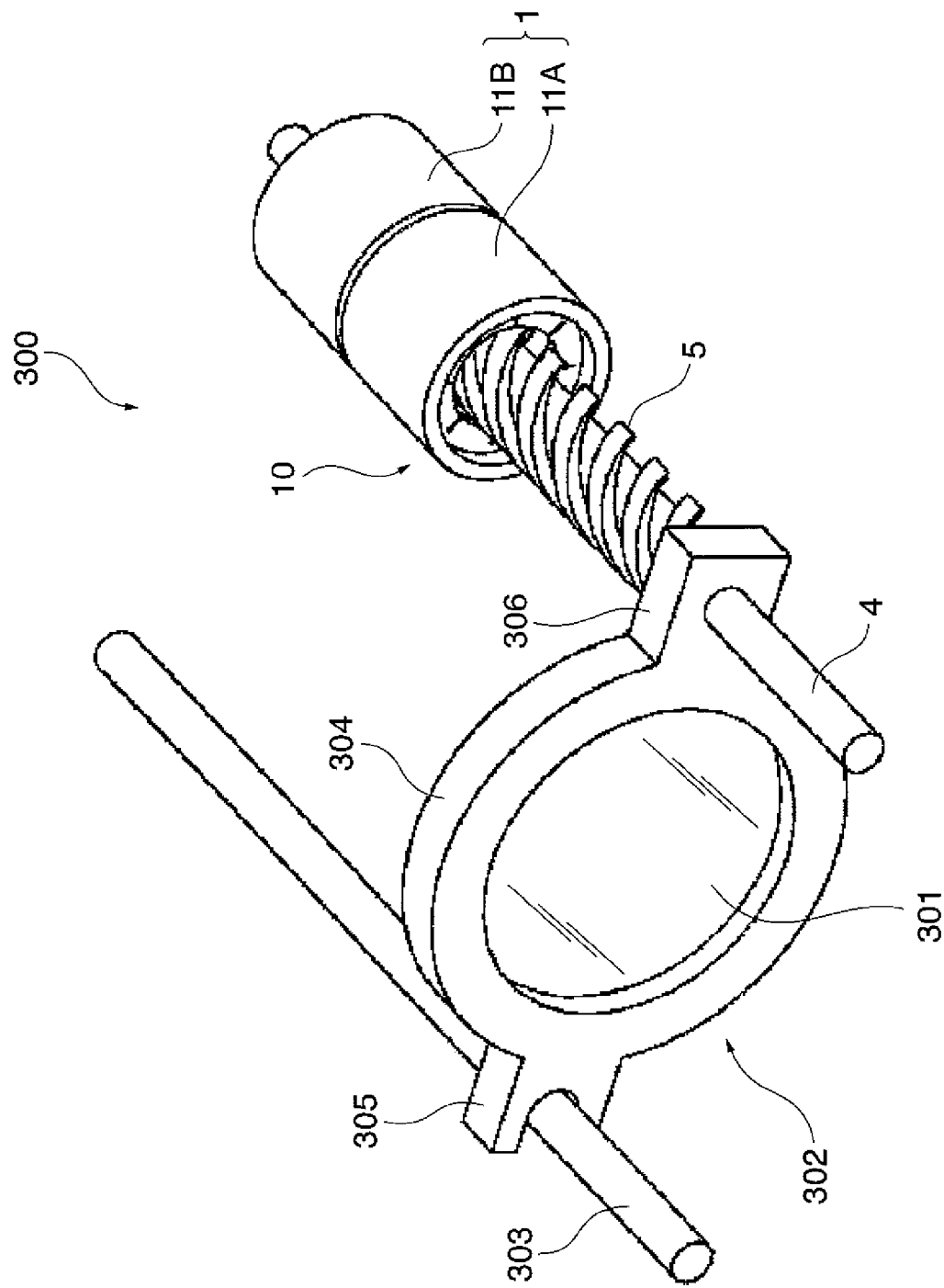
FIG. 10 is a perspective view of a lens driving device including the motor shown in FIG. 1.

FIG. 10 is a perspective view of a lens driving device including the motor 10 shown in FIG. 1.

In FIG. 10, a lens driving device 300 is comprised of the motor 10, a lens holding frame 302, and a detent 303. As in the first embodiment, the motor 10 is comprised of the stator yoke 1 having the first outer yoke 11A and the second outer yoke 11B, the support bar 4, and the slider 5.

The lens holding frame 302 is integral with the slider 5 and comprised of a holding part 304 for holding a camera lens 301, an engaging part 305 formed with a notch adapted to be engaged with the detent bar 303, and an insertion part 306 formed with a hole into which the support bar 4 is inserted. By engaging the detent bar 303 in the notch of the engaging part 305 of the lens holding frame 302, the slider 5 integral with the lens holding frame 302 can be restrained from rotating relative to the stator 1. Further, by inserting the support bar 4 into the hole of the insertion part 306 of the lens holding frame 302, the slider 5 can be rectilinearly moved in the axial direction, and the axial position of the lens 301 can be freely determined. Namely, the lens holding frame 302 is moved with the slider 5.

Figure 11:
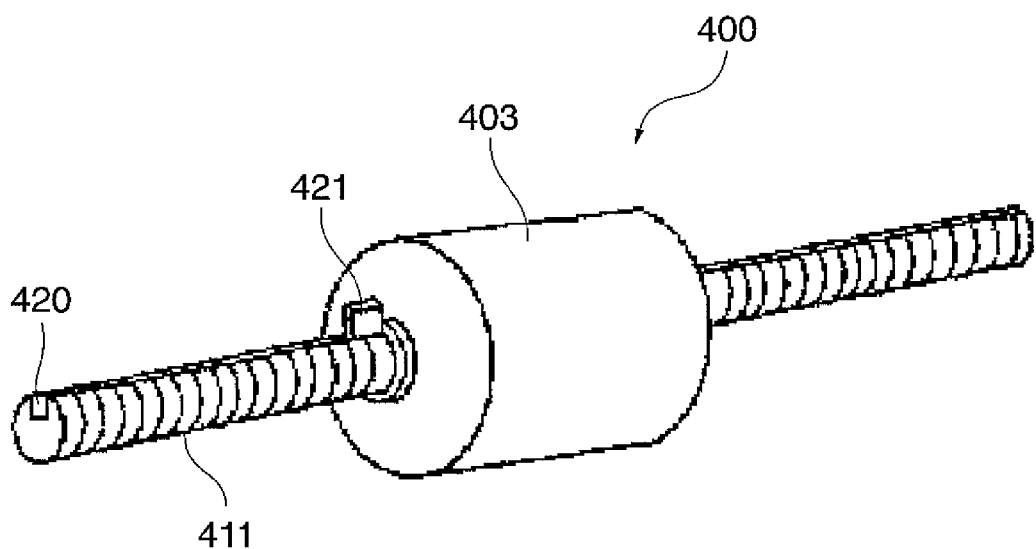
FIG. 11 is a perspective view showing a configuration of a first example of a shaft moving type prior art motor.
Figure 12:
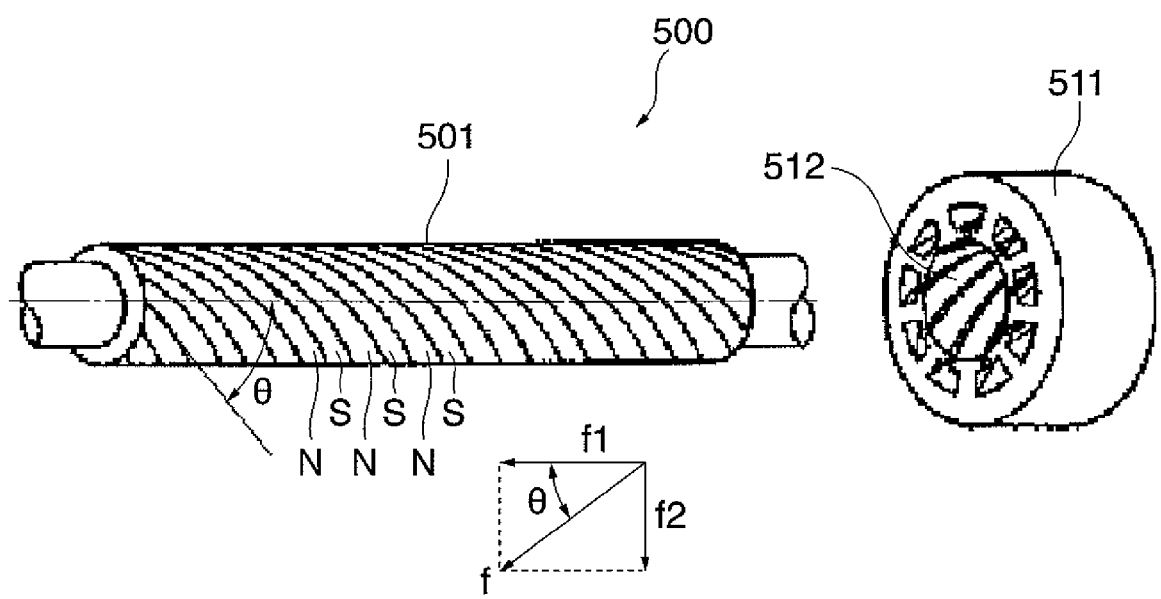
FIG. 12 is a perspective view showing a configuration of a second example of a prior art motor.

As described above, by driving the camera lens 301 by using the lens driving device 300 having the above described construction, wear and noise can be reduced as compared with the case of using the motor 400 (FIG. 11) described in the above described Japanese Laid-Open Patent Publication (Kokai) NO. 06-078494. Further, as compared with the motor 500 (FIG. 12) described in the above described Japanese Patent Publication No. 3434430, the lens driving device 300 and a camera can be provided which are easy to manufacture and capable of producing a large propulsive force for rectilinear movement of the slider 5 and realizing reduction in diameter.

In the above described first and third embodiments, the stator is disposed on the outer side the motor and the slider is disposed on the inner side of the motor, while in the above described second embodiment, the stator is disposed inside the motor and the slider is disposed outside the motor. In the present invention, either of these arrangements may be used.

In the first embodiment, the first magnetic pole part and the second magnetic pole part are integrally constructed (the magnetic pole parts not being separated into the first and the second magnetic pole parts), while in the second embodiment, the first magnetic pole part and the second magnetic pole part are separated from each other. In the present invention, either of them may be adopted. When the first magnetic pole part and the second magnetic pole part are made integral, the motor can be made compact, and when the first magnetic pole part and the second magnetic pole part are separately constructed, magnetic interference therebetween caused when corresponding coils are excited can be decreased.

In the third embodiment, the magnets, the stator, and the coils are formed into a hollow regular square column shape, but the shapes of them are not limited thereto. These components may be formed into hollow polygonal column shapes (a square column shape, a regular hexagonal column shape, a hexagonal column shape, a regular octagon column shape, an octagon column shape, etc.) other than a regular square column shape.

In the above, the lens driving device 300 in which the camera lens 301 is driven by the motor 10 has been described as an example with reference to FIG. 10, but in the driving device using the motor according to any of the first to third embodiments, the object to be driven by the motor is not limited to the camera lens 301. The present invention is also applicable to various fields of industry such as mechanism positioning in machine tools and slide seat motion in automobiles.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-214898, filed Jul. 25, 2005, which is hereby incorporated by reference herein in its entirety.

What is claimed is:

1. A driving device comprising:
   a slider formed of a soft magnetic material and having at least one spiral member disposed along a predetermined axial direction;
   a stator formed of a soft magnetic material;
   a first coil fixed to said stator, for at least partially magnetizing a first area of said spiral member;
   a second coil fixed to said stator, for at least partially magnetizing a second area of said spiral member;
   a first magnet fixed to said stator and having a magnetized surface thereof opposed to the first area and magnetized in a shape corresponding to a shape of said spiral member; and
   a second magnet fixed to said stator and having a magnetized surface thereof opposed to the second area and magnetized in a shape corresponding to the shape of said spiral member,
   wherein said slider is disposed inside said stator;

wherein said first coil, said second coil, said first magnet and said second magnet are disposed coaxially with one another and parallel to the predetermined axial direction, and;

wherein said stator is disposed at an outer peripheral side of each of said first and second coils and said first and second magnets.

2. The driving device as claimed in claim 1, wherein said slider is disposed outside said stator.

3. The driving device as claimed in claim 1, wherein said first and said second magnets are each formed into a cylindrical shape.

4. The driving device as claimed in claim 1, wherein said first and said second magnets are each formed into a hollow rectangular column shape.

5. The driving device as claimed in claim 1, wherein each of the magnetized surfaces of said first and second magnets has a predetermined number of magnetic poles; and wherein said spiral member of said slider includes as many ridges as half the predetermined number of the magnetic poles of each of said first and second magnets.

6. The driving device as claimed in any one of claims 1 to 5 further comprising:

an object holder for holding an object, said object holder being movable in unison with said slider of said driving device.

7. The driving device as claimed in claim 6, wherein the object is a camera lens.

* * * * *